US006547644B1

(12) United States Patent
Yamada et al.

(10) Patent No.: US 6,547,644 B1
(45) Date of Patent: Apr. 15, 2003

(54) POLISHING PAD

(75) Inventors: Takeyoshi Yamada, Iwakuni (JP);
Hidetsugu Yoshida, Iwakuni (JP);
Nobuo Yoshikiyo, Chiyoda-ku (JP)

(73) Assignee: Teijin-Metton Kabushiki Kaisha, Tokyo (JP)

( * ) Notice: Subject to any disclaimer, the term of this patent is extended or adjusted under 35 U.S.C. 154(b) by 43 days.

(21) Appl. No.: 09/830,458

(22) PCT Filed: Aug. 31, 2000

(86) PCT No.: PCT/JP00/05921

§ 371 (c)(1),
(2), (4) Date: Apr. 27, 2001

(87) PCT Pub. No.: WO01/17725

PCT Pub. Date: Mar. 15, 2001

(30) Foreign Application Priority Data

Sep. 2, 1999 (JP) .......................................... 11-248487

(51) Int. Cl.⁷ .................................................. C08F 4/62
(52) U.S. Cl. .......................... 451/36; 428/63; 428/163; 428/173
(58) Field of Search ............................. 451/36; 428/63, 428/163, 167, 173

(56) References Cited

U.S. PATENT DOCUMENTS

| 4,391,737 A | * | 7/1983 | Bell | 502/154 |
| 4,465,890 A | * | 8/1984 | Kukes et al. | 585/645 |
| 4,522,936 A | * | 6/1985 | Kukes et al. | 502/249 |
| 4,568,660 A | * | 2/1986 | Klosiewicz | 502/102 |
| 4,598,102 A | * | 7/1986 | Leach | 264/328.1 |
| 4,703,098 A | | 10/1987 | Matlack | |
| 5,278,305 A | * | 1/1994 | Kelsey | 252/182.18 |
| 5,344,804 A | * | 9/1994 | Sjardijn et al. | 502/158 |
| 5,369,195 A | * | 11/1994 | Kelsey | 502/117 |

FOREIGN PATENT DOCUMENTS

| JP | 3120021 | 5/1991 |
| JP | 911119 | 1/1997 |

* cited by examiner

Primary Examiner—Joseph J. Hail, III
Assistant Examiner—Anthony Ojini
(74) Attorney, Agent, or Firm—Sherman & Shalloway

(57) ABSTRACT

A polishing pad for polishing a surface of a work, (A) said polishing pad being made of a resin formed of a ring-opened polymer from a cycloolefin by metathesis polymerization, and (B) said resin having a heat deformation temperature of 90 to 135° C., a compression elastic modulus of 980 to 2,940 MPa and a water absorption of 0.01 to 0.25% by weight.

The polishing pad of the present invention has a proper hardness, shows a low water absorption, causes no damage on a work surface and has durability.

24 Claims, No Drawings

POLISHING PAD

DETAILED DESCRIPTION OF THE INVENTION

1. Field of the Invention

The present invention relates to a polishing pad for polishing the surface of a glass for a liquid crystal substrate, a glass substrate for a hard disk, a substrate such as a semiconductor wafer, an optical glass or a mirror, and use thereof.

2. Prior Art

In recent years, as a display, a semiconductor, and the like have come to have an ultra-fine and high-density structure, and it is accordingly required to polish the surface of,a substrate, etc., highly accurately for use therefor. In an optical glass, etc., further, the surface thereof is also required to have a high flatness for inhibiting a strain, and the like. Polishing methods have been developed in various ways, and it is current practice to carry out polishing with a slurry containing, as an abrasive, inorganic fine particles such as cerium oxide particles.

As a polishing pad for use in the above polishing, there is known a pad formed of a polyurethane resin, particularly, a polyurethane foam resin. However, the polyurethane resin involves problems that it has poor durability as a polishing pad since it is soft and that the entire convexo-concave surface of a work is polished since the pad is soft, so that not only a convex portion which needs polishing but also a concave portion is polished, and the convexo-concave shape is not easily removed.

Further, a pad formed of a nylon resin is used as well. However, an aqueous slurry containing fine particles is used together in many cases, and there is therefore caused a problem that the nylon resin absorbs water, so that the pad is deformed to cause streaks in the surface of a work.

Further, JP-A-9-11119 discloses the use of a resin having a Young's modulus of at least 1 GPa for a polishing pad. As a specific embodiment, this Publication describes a polishing pad made of a polycarbonate resin. A polycarbonate resin has a water absorption of approximately 0.3% by weight and easily absorbs water, so that nothing has been solved with regard to the above problem caused by the deformation of the pad when an aqueous slurry containing an abrasive is used.

Problems to be Solved by the Invention

It is an object of the present invention to provide a polishing pad having a proper hardness, having durability, having a low water absorption and having easy formability to various shapes.

Means to Solve the Problems

The present inventors have made diligent studies for overcoming the above problems and as a result have found that a resin formed of a ring-opened polymer from a metathesis-polymerizable cycloolefin satisfies properties required of a polishing pad, and the present invention has been accordingly arrived at.

That is, the present invention is as follows.

I. A polishing pad for polishing a surface of a work, which comprises
  (A) said polishing pad being made of a resin formed of a ring-opened polymer from a cycloolefin by metathesis polymerization, and
  (B) said resin having a heat distortion temperature of 90 to 135° C., a compression modulus of 980 to 2,940 MPa and a water absorption of 0.01 to 0.25% by weight.

II. A method of polishing the surface of a work with using, as an abrasive, a slurry containing fine particles, wherein the above pad is used as a polishing pad.

The present invention will be more specifically explained hereinafter.

The resin for forming the polishing pad of the present invention is a crosslinked polymer formed of a ring-opened polymer from a metathesis-polymerizable cycloolefin.

The above metathesis-polymerizable cycloolefin is selected from olefins having one or two metathesis-polymerizable cycloalkene groups per molecule, and it is preferably a compound having at least one norbornene skeleton per molecule. Specific examples thereof include dicyclopentadiene, tricyclopentadiene, cyclopentadiene-methyl cyclopentadiene co-dimeter, 5-ethylidenenorbornene, norbornene, norbornadiene, 5-cyclohexenylnorbornene, 1,4,5,8-dimethano-1,4,4a,5,6,7,8,8a-octahydronaphthalene, 1,4-methano-1,4,4a,5,6,7,8,8a-octahydronaphthalene, 6-ethylidene-1,4,5,8-dimethano-1,4,4a,5,6,7,8,8a-octahydronaphthalene, 6-ethylidene-1,4-methano-1,4,4a,5,6,7,8,8a-octahydronaphthalene, 1,4,5,8-dimethano-1,4,4a,5,8,8a-hexahydronaphthalene and ethylenebis(5-norbornene). Mixtures of these may-be also used. It is particularly preferred to use a cycloolefin mixture containing at least 50 mol %, preferably at least 70 mol %, of dicyclopentadiene based on the total of cycloolefins. It is the most preferred to-use a cycloolefin mixture containing at least 80 mol % of dicyclopentadiene based on the total of cycloolefins.

Further, a metathesis-polymerizable cycloolefin having a polar group containing different elements such as oxygen, nitrogen, etc., can be used as a comonomer as required. The above comonomer preferably has a norbornene structure unit, and the polar group preferably includes an ester group, an ether group, a cyano group, an N-substituted imide group and a halogen group. Specific examples of the above comonomer include 5-methoxycarbonylnorbornene, 5-(2-ethylhexyloxy)carbonyl-5-methylnorbornene, 5phenyloxymethylnorbornene, 5-cyanonorbornene, 6-cyano-1,4,5,8-dimethano-1,4,4a,5,6,7,8,8a-octahydronaphthalene, N-butyl Nadic acid imide and 5-chloronorbornene.

The resin used in the present invention is a crosslinked polymer obtained by metathesis polymerization of the above metathesis-polymerizable cycloolefin. The catalyst that is used for the metathesis polymerization can be selected from known catalysts. For example, a ruthenium-complex catalyst can be used as a metathesis polymerization catalyst. Further, there can be used a metathesis polymerization catalyst which is a combination of a catalyst component with an activator component as will be described later. It is substantially excellent to use, as a metathesis polymerization catalyst, a metathesis catalyst system which is a combination of a catalyst component and an activator component. The method for producing a crosslinked polymer of a cycloolefin in the presence of the above metathesis catalyst will be explained in detail below.

This method is a method in which a monomer solution is divided into two monomer solutions, the catalyst component for the metathesis polymerization catalyst system is incorporated into one monomer solution A (solution A), the activator component for the metathesis polymerization catalyst system is incorporated into the other monomer solution B (solution B) and these two solutions are mixed when polymerization and molding are carried out.

That is, the monomer solution A (solution A) contains the catalyst component for the metathesis polymerization catalyst system. The catalyst component can be selected from a halide or an ammonium salt of a metal such as tungsten, rhenium, tantalum, molybdenum, or the like. A tungsten compound is particularly preferred. The tungsten compound preferably includes tungsten hexahalide and tungsten oxyhalide, and more specifically, tungsten; hexachloride or tungsten oxychloride is preferred. Further, an organic ammonium tungstate may be used.

It is undesirable to directly add the above tungsten compound to a monomer, since it is already known that the above tungsten compound initiates cationic polymerization as soon as it is directly added. Preferably, therefore, the above tungsten compound is suspended in an inert solvent such as benzene, toluene or chlorobenzene in advance and a small amount of an alcohol compound and/or a phenolic compound are/is added to solubilize it before use.

For preventing the: above undesirable polymerization, it is preferred to add approximately 1 to 5 mol, per mole of the tungsten compound, of Lewis acid base or a chelating agent. This additive includes acetylacetone, acetoacetic alkyl ester, tetrahydrofuran and benzonitrile.

When a polar monomer is used, it can be among the above Lewis bases in some cases, and it sometimes has the above function without adding the above compound. In the above manner, the monomer solution A (solution A) containing the catalyst component comes to have substantially sufficient stability.

The monomer solution B (solution B) contains the activator component for the metathesis polymerization catalyst system. The activator component is preferably selected from organometal compounds mainly including alkylated compounds of metals coming under the groups I to III of the periodic table, particularly tetralakyltin, an alkyl aluminum compound and an alkyl aluminum halide compound. Specific examples thereof include diethyl aluminum chloride, ethyl aluminum dichloride, triethyl aluminum, diethyl aluminum iodide, trioctyl aluminum, dioctyl aluminum iodide and tetrabutyltin. The organometal compound as an activator component is dissolved in the monomer, whereby the monomer solution B (solution B) is prepared.

In principle, the above solution A and the above solution B are mixed and the mixture is cast into a mold, whereby an intended molded article of a crosslinked polymer can be obtained. In the mixture having such a composition, however, the polymerization takes place very rapidly, so that curing sometimes takes place before the mixture is fully cast into the mold, which may cause a problem. It is therefore preferred to use an activation adjuster. The activation adjuster is generally selected from Lewis bases, and above all, it is selected from ethers, esters and nitriles. Specific examples thereof include ethyl benzoate, butyl ether and diglyme. Generally, the above adjuster is added to the solution (solution B) containing an organometal compound as an activator. As described above, when a monomer having a Lewis base is used, it can be allowed to work as an adjuster.

Concerning the amount of the metathesis polymerization catalyst system, when a tungsten compound is used as a catalyst component, the molar ratio of the above monomer/tungsten compound is in the range of from approximately 1,000/1 to 15,000/1, preferably from 1,500/1 to 10,000/1, and when an alkyl aluminum compound is used as an activator component, the molar ratio of the above monomer/alkyl aluminum compound is in the range of from approximately 100/1 to 10,000/1, preferably from 200/1 to 1,000/1. Further, each of the above chelating agent and the above adjuster can be used in an amount experimentally adjusted as required depending upon the amount of the above catalyst system.

The molded article of a crosslinked polymer obtained by the above metathesis polymerization may contain various additives for improving or maintaining the properties thereof for purposes in practical use. Such additives include a filler, a pigment, an antioxidant, a light stabilizer, a flame retardant and a polymer modifier. These additives cannot be added after the crosslinked polymer of the present invention is formed, so that it is required to add them to the above source solutions beforehand.

It is the simplest method that can be employed to add them to the above solution A, the above solution B or both in advance. In this case, however, the additives are required not to react with a highly reactive catalyst component, the activator component, in the solution, so that no practical difficulty is caused, and the additives are required not to inhibit the polymerization. When some additive(s) that will cause the above reaction are to be co-present, but if such additive(s) substantially does not inhibit the polymerization or takes time to some extent to inhibit the polymerization, such additive(s) may be mixed with monomer as required to prepare a third solution and the mixture may be incorporated when the solution A and the solution B are mixed. Further, when a solid filler is used, and if the filler has a form that can be fully filled in a space immediately before or while the above two components are mixed to initiate the polymerization, it may be filled in a mold in advance. A reinforcing material or a filler as an additive has an effect on improving the crosslinked polymer in flexural strength. Such a reinforcing material or such a filler includes a glass fiber, mica, carbon black and wollastonite.

The crosslinked polymer resin obtained by the metathesis polymerization according to the above method preferably has the following properties with regard to a heat deformation temperature, a compression elastic modulus and water absorption.

That is, the resin as a whole suffers a temperature increase due to a frictional heat during polishing, and it is preferably a material having heat resistance. It is required to have a heat distortion temperature of at least 90° C., and it preferably has a heat deformation temperature of 90 to 135° C., particularly preferably 100 to 125° C.

The compression elastic modulus thereof is 980 to 2,940 MPa (10,000 to 30,000 kgf/cm$^2$), preferably 1,274 to 2,450 MPa (13,000 to 25,000 kgf/cm$^2$), more preferably 1,568 to 1,960 MPa (16,000 to 20,000 kgf/cm$^2$). When the compression elastic modulus is smaller than 980 MPa (10,000 kgf/cm$^2$), it is difficult to polish the convex portions alone of a convexo-concave surface, and the durability of the pad during polishing is poor.

When the compression elastic modulus is more than 2,940 MPa, the pad may damage the surface of a work during polishing, and the compression elastic modulus is preferably not more than 2,940 MPa.

The water absorption of the resin used in the present invention is determined on the basis of a difference between weights before and after immersion at water at 25° C. for 24 hours. The water absorption is 0.01 to 0.25% by weight, preferably 0.02 to 0.20% by weight, more preferably 0.03 to 0.1% by weight. A resin having such a water absorption can be used without any changing on a form and the properties of the resin when it is used together with a slurry of an abrasive in water.

Further, the resin used in the present invention has excellent impact resistance. The resin has an impact resistance, as a notched Izod value, of 98 to 784 J/m (10 to 80 kg.cm/cm), preferably 196 to 588 J/m (20 to 60 kg.cm/cm). A material having such a property can be used without breaking not only when used for polishing but also when handled for assembly.

The resin used in the present invention may contain 0.01 to 1% by weight of a surfactant. For incorporating the surfactant, there may be employed a method in which a predetermined amount of the surfactant is added to the solution A and/or the solution B. The content of the surfactant is preferably in the range of from 0.02 to 0.5% by weight, particularly preferably 0.03 to 0.25% by weight. The surfactant contained in the resin gives advantages that the polishing pad hardly causes polishing damage or defect on a work and that the polishing pad is improved in durability.

The surfactant to be incorporated into the crosslinked polymer can be selected from all of anionic, cationic, amphoteric and nonionic surfactants. When the surfactant is added to the solution A or the solution B beforehand, it is required to select the surfactant that does not react with the catalyst or activator. Generally, a nonionic surfactant is preferred. As far as a chemical structure is concerned, a fluorine-containing surfactant that has a remarkable effect on decreasing a surface_tension or a silicon-containing surfactant is preferred, and a fluorine-containing nonionic surfactant is particularly preferred.

The above fluorine-containing surfactant includes fluorinated alkyl ester, perfluoroalkylethylene oxide adduct, perfluoroalkylamine oxide and perfluoroalkyl-containing oligomer. Of these, fluorinated alkyl ester and perfluoroalkylethylene oxide adduct are suitably used.

The resin used in the present invention may be obtained by adding other polymer to a monomer in a solution state during molding. Addition of an elastomer as the above polymer additive produces a remarkable effect on improving a molded product in impact resistance and adjusting the viscosity of the solution. The elastomer used for the above purpose includes a broad range of elastomers such as styrene-butadiene-styrene triblock rubber, styrene-isoprene-styrene triblock rubber, polybutadiene, polyisoprene, butyl rubber, ethylene-propylene-diene terpolymer, nitrile rubber, and the like.

Preferably, the resin used in the present invention contains an antioxidant beforehand. For this purpose, it is desirable to add a phenolic or amino-containing antioxidant to the solution(s) in advance. Specific examples of the antioxidant include 2,6-di-tert-butyl-p-cresol, N,N'-diphenyl-p-phenylenediamine, tetrakis[methylene(3,5-di-tert-butyl-4-hydroxycinnamate)]methane.

The polishing pad of the present invention has flat plate form or a curved form when used. For stably supplying a slurry containing fine particles, generally, the above form is provided with grooves.

The above grooves can be formed by cutting a molded product of the resin. Since, however, the resin used in the present invention is molded concurrently with the polymerization by casting the solution mixture in a liquid state into a mold, the flat plate or curved form, particularly, the flat plate or curved form having the grooves, can be easily obtained by pre-forming a mold capable of providing such a form. The grooves of the polishing pad desirably has a depth of 0.3 to 5 mm, a width of 0.3 to 4 mm and a pitch of 0.5 to 4 mm, preferably has a depth of 0.4 to 4 mm, a width of 0.4 to 3.5 mm and a pitch of 0.6 to 3.5 mm, particularly preferably has a depth of 1 to 3 mm, a width of 1 to 3 mm and a pitch of 1 to 3 mm. Desirably, the polishing pad has a thickness of 0.5 to 15 mm, preferably 0.5 to 10 mm.

The material for forming the mold for molding the polishing pad includes steel, cast or forged aluminum, a casting or thermal spraying of a zinc alloy, an electro forming of nickel or copper and a resin. Further, the structure of the mold can be simple, since a pressure generated in the mold during molding is very low, as low as several $kg/cm^2$, as compared with any other molding method, and the mold can be prepared at a low cost as compared with any mold used in other molding method.

In the polishing pad of the present invention, further, abrasive particles such as silica particles, cerium oxide particles, manganese dioxide particles or alumina particles may be dispersed in the resin beforehand for improving the polishing efficiency thereof.

The polishing pad of the present invention can be used according to a known method. For example, there is employed a method in which a flat-plate-shaped polishing pad having a number of grooves is set on a bed and while a slurry containing fine particles of cerium oxide or silica is supplied at a constant rate, the bed is rotated or reciprocally moved to polish a work, e.g., a glass plate for a liquid crystal display. Naturally, the method of use in the present invention shall not be limited thereto.

For example, the polishing pad of the present invention can be advantageously used for polishing the surface of a sheet glass, a silicon wafer or an Intermediary substrate in the course of LSI production to form a highly flat and smooth surface. When it is used for polishing a sheet glass, there can be obtained a smooth glass remarkably suitable for maintaining a liquid crystal compound as a layer for liquid crystal display. Further, the polishing pad of the present invention is also suitable for flattening in the step of multi-layered wiring in LSI production, so-called CMP (chemical mechanical polishing).

The fine-particles-containing slurry used together with the use of the polishing pad of the present invention is an aqueous slurry containing silica particles, cerium oxide particles, alumina particles, zirconia particles, silicon carbide particles or manganese oxide particles. Silica particles or cerium oxide particles in particular are excellent. Kinds and sizes of the particles are properly selected depending upon materials and kinds of a work to be polished and degrees of polishing.

EXAMPLES

The present invention will be explained with reference to Examples hereinafter. Examples are provided for an explanation purpose, and the present invention shall not be limited thereto.

A heat distortion temperature (HDT) was measured according to the following method.

A test piece having a thickness of 3 mm was measured for a heat distortion temperature (HDT) under a load of 1.81 MPa according to the testing method of JIS-K720.

Referential Example 1
(Preparation of Solution A)

28 Parts by weight of tungsten hexachloride was added to 80 parts by weight of dry toluene under nitrogen gas current. Then, a solution of 1.3 parts by weight of t-butanol in 1 part by weight of toluene was added, and the mixture was stirred for 1 hour. Then, a solution containing 18 parts by weight of nonylphenol and 14 parts by weight of toluene was added, and the mixture was stirred under nitrogen gas current for 5 hours. Further, 14 parts by weight of acetylacetone was added. While hydrogen chloride gas being generated as a by-product is purged, the mixture was continuously stirred under nitrogen gas current overnight, to obtain a catalyst solution for polymerization.

Then, a monomer solution A (solution A) containing a catalyst component was prepared by adding the above catalyst solution for polymerization to the following solution such that the monomer solution A had a tungsten content of 0.01 M/L. The solution had been prepared by adding 3 parts by weight of an ethylene-propylene-ethylidene norbornene copolymer rubber having an ethylene content of 70 mol % and 2 parts by weight of Ethanox 702 supplied by Ethyl-Corp. as an oxidation stabilizer to a monomer mixture containing 95 parts by weight of purified dicyclopentadiene (purity 99.7% by weight, same to be used hereinafter has the same purity) and 5 parts by weight of purified ethylidene norbornene (purity 99.5% by weight, same to be used hereinafter has the same purity).

Referential Example 2
(Preparation of Solution B)

A monomer solution B (solution B) containing an activator component was prepared by adding an activator mixture solution for polymerization which mixture solution had a trioctyl aluminum/dioctyl aluminum iodide/diglyme molar ratio of 85/15/100 to the following solution such that the monomer solution B had an aluminum content of 0.03 M/L. The solution had been prepared by dissolving 3 parts by weight of an ethylene-propylene-ethylidene norbornene copolymer rubber having an ethylene content of 70 mol % in a monomer mixture containing 95 parts by weight of purified dicyclopentadiene and 5 parts by weight of purified ethylidene norbornene.

Example 1
(Molding)

A mold was prepared from a forged aluminum material, which mold was for shaping a molded product having a structure in which a number of grooves having a depth of 2 mm and a width of 1.5 mm were made at a pitch of 1.5 mm in a plate having a thickness of 5 mm, a width of 91.5 mm and a length of 500 mm along the length direction of the plate and the central portion of the plate had two holes having a diameter of 10 mmΦ each for feeding a slurry. In the above mold, the temperature on the groove side (cavity side) was adjusted to 85° C., the temperature on the plate side (core side) was adjusted to 55° C., the above monomer solution A and the above monomer solution B were allowed to collide and mixed in a weight ratio of 1:1, and the mixture was cast into the mold. Polymerization immediately started, and after 5 minutes, a product was taken out of the mold to give a molded polishing pad.

Separately, a 3 mm thick plate was molded and measured for physical properties to show a heat deformation temperaturie of 105° C., a compression elastic modulus of 1,695 MPa (17,300 kgf/cm$^2$), a water absorption of 0.04% by weight and a notched Izod value of 441 J/m (45 kg.cm/cm).
(Polishing)

The above polishing pad was attached to an aluminum plate, and while a slurry of cerium oxide particles was supplied through the holes at a constant rate, the aluminum plate was rotated, to polish a glass plate produced by a float method. While the glass plate produced by a float method had had microscopic valleys and hills having a level difference of 0.2 to 0.3 μm at a pitch of approximately 10 mm on its surface, the level difference between the microscopic valleys and hills came to be 0.05 μm or less after the polishing was carried out for 15 minutes. The polishing pad was continuously used for 1 week, to show no change in the polishing performance thereof.

Referential Example 3
(Preparation of Solution A')

28 Parts by weight of tungsten hexachloride was added to 80 parts by weight of dry toluene under nitrogen gas current, then, a solution of 1.3 parts by weight of t-butanol in 1 part by weight of toluene was added, and the mixture was stirred for 1 hour. Then, a solution containing 18 parts by weight of nonylphenol and 14 parts by weight of toluene was added, and the mixture was stirred under nitrogen gas current for 5 hours. Further, 14 parts by weight of acetylacetone was added, and while hydrogen chloride gas being generated as a by-product was purged, the mixture was continuously stirred under nitrogen current overnight, to obtain a catalyst solution for polymerization.

Then, a monomer solution A' (solution A') containing a catalyst component was prepared by adding the above catalyst solution for polymerization to the following solution such that the monomer solution A' had a tungsten content of 0.01 M/L. The solution had been prepared by adding 3 parts by weight of an ethylene-propylene-ethylidene norbornene copolymer rubber having an ethylene content of 70 mol % and 2 parts by weight of Ethanox 702 supplied by Ethyl-Corp. as an oxidation stabilizer to a monomer mixture containing 95 parts by weight of purified dicyclopentadiene (purity 99.7% by weight, same to be used hereinafter has the same purity) and 5 parts by weight of purified ethylidene norbornene (purity 99.5% by weight, same to be used hereinafter has the same purity). Then, a fluorinated alkyl ester was added to the monomer solution A' such that the content thereof was 0.2% by weight, and the mixture was stirred.

Referential Example 4
(Preparation of Solution B')

A monomer solution B' (solution B') containing an activator component was prepared by adding an activator mixture solution for polymerization which mixture solution had a triethyl aluminum/diglyme molar ratio of 100/103 to the following solution such that the monomer solution B' had an aluminum content of 0.03 M/L. The solution had been prepared by dissolving 3 parts by weight of an ethylene-propylene-ethylidene norbornene copolymer rubber having an ethylene content of 70 mol % in a monomer mixture containing 95 parts by weight of purified dicyclopentadiene and 5 parts by weight of purified ethylidene norbornene.

Example 2
(Molding)

A mold was prepared from a forged aluminum material, which mold was for shaping a molded product having a structure in which a number of grooves having a depth of 2 mm and a width of 1.5 mm were made at a pitch of 1.5 mm in a plate having a thickness of 5 mm, a width of 91.5 mm and a length of 500 mm along the length direction of the plate and the central portion of the plate had two holes having a diameter of 10 mmΦ each for feeding a slurry. In the above mold, the temperature on the groove side (cavity side) was adjusted to 115° C., the temperature on the plate side (core side) was adjusted to 75° C., the above monomer solution A' and the above monomer solution B' were allowed to collide and mixed in a weight ratio of 1:1, and the mixture was cast into the mold. Polymerization immediately started, and after 5 minutes, a product was taken out of the mold to give a molded polishing pad.

Separately, a 3 mm thick plate was molded and measured for physical properties to show a heat distortion temperature of 111° C., a compression modulus of 1,793 MPa (18,300 kgf/cm$^2$), a water absorption of 0.03% by weight and a notched Izod value of 412 J/m (42 kg.cm/cm).
(Polishing)

The above polishing pad was attached to an aluminum plate, and while a slurry of cerium oxide particles was supplied through the holes at a constant rate, the aluminum plate was rotated, to polish a glass plate produced by a float method. While the glass plate produced by a float method had had microscopic valleys and hills having a level difference of 0.2 to 0.3 μm at a pitch of approximately 10 mm on its surface, the level difference between the microscopic valleys and hills came to be 0.05 μm or less after the polishing was carried out for 15 minutes. The polishing pad was continuously used for 10 days, to show no change in the polishing performance thereof. Further, when the pressure for the polishing was increased, no damage was caused on the glass.

Comparative Example 1
(Polishing)

A polishing pad having the same form as that of the polishing pad used in Example 1 was made from a urethane foam resin. The polishing pad had a compression modulus of 74 MPa (750 kgf/cm$^2$). When the polishing pad was used for polishing in the same manner as in Example 1, the level difference came to be 0.05 μm or less, but the entire surface had a great convexo-concave undulation. When the polishing pad was used continuously, the grooves of the polishing pad came to be non-uniform in two days, and a great convex-concave shape came to remain, so that the polishing pad could no longer be used as such.

Example 3
(Molding)

A solution A" was prepared in the same manner as in the preparation of the solution A' except that fluorinated alkyl ester was added to the monomer solution A' such that the content thereof was 0.4% by weight. A polishing pad was produced from the solution A" and the solution B' in the same manner as in Example 2.

Separately, a 3 mm thick plate was molded and measured for physical properties to show a heat distortion temperature of 109° C., a compression modulus of 1,780 MPa, a water absorption of 0.03% by weight and a notched Izod value of 441 J/m.
(Polishing)

The above polishing pad was attached to an aluminum plate, and a glass plate produced by a float method was polished with it in the same manner as in Example 2 to show that the level difference of microscopic valleys and hills on the surface of the glass came to be 0.05 μm or less after the polishing was carried out for 15 minutes. When it was continuously used for polishing for 10 days, it showed no change in polishing performance. Further, when a polishing pressure was varied, the surface of the glass was not damaged, and it has been found that the polishing pad can be applied under broad conditions.

Referential Example 5
(Preparation of Solution As''')

A monomer solution A''' (solution A''') containing a catalyst component was prepared in the same manner as in the preparation of the solution A' in Referential Example 3 except that the monomer mixture was replaced with a monomer mixture containing 32 parts by weight of purified dicyclopentadliene (purity 99.7% by weight, same to be used hereinafter has the same purity) and 68 parts by weight of purified ethylidene norbornene (purity 99.5% by weight, same to be used hereinafter has the same purity). Then, a fluorinated alkyl ester was added to the monomer solution A''' such that the content thereof was 0.2% by weight, and the mixture was stirred.

Referential Example 6
(Preparation of Solution B''')

A monomer solution B''' (solution B''') containing an activator component was prepared in the same manner as in the preparation of the solution B' in Referential Example 4 except that the monomer mixture was replaced with a monomer mixture containing 32 parts by weight of purified dicyclopentadiene and 68 parts by weight of purified ethylidene norbornene.

Comparative Example 2
(Molding)

A mold was prepared from a forged aluminum material, which mold was for shaping a molded product having a structure in which a number of grooves having a depth of 2 mm and a width of 1.5 mm were made at a pitch of 1.5 mm in a plate having a thickness of 5 mm, a width of 91.5 mm and a length of 500 mm along the length direction of the plate and the central portion of the plate had two holes having a diameter of 10 mmΦ each for feeding a slurry. In the above mold, the temperature on the groove side (cavity side) was adjusted to 115° C., the temperature on the plate side (core side) was adjusted to 75° C., the above monomer solution A''' and the above monomer solution B''' were allowed to collide and mixed in a weight ratio of 1:1, and the mixture was cast into the mold. Polymerization immediately started, and after the mold was cooled, a product was taken out of the mold to give a molded polishing pad.

Separately, a 3 mm thick plate was molded and measured for physical properties to show a heat distortion temperature of 81.2° C., a compression modulus of 1,548 MPa, a water absorption of 0.03% by weight and a notched Izod value of 431 J/m.
(Polishing)

The above polishing pad was attached to an aluminum plate, and while a slurry of cerium oxide particles was supplied through the holes at a constant rate, the aluminum plate was rotated, to polish a glass plate produced by a float method. While the glass plate produced by a float method had had microscopic valleys and hills having a level difference of 0.2 to 0.3 μm at a pitch of approximately 10 mm on its surface, the level difference between the microscopic valleys and hills came to be 0.05 μm or less after the polishing was carried out for 15 minutes. However, damage in the form of streaks was formed on the polished surface. When the polishing pad was continuously used, the number of defects in the form of streaks increased. Further, when the pressure for the polishing was increased, the number of defects in the form of streaks also increased.

Effect of the Invention

According to the present invention, there can be provided a polishing pad that has a proper hardness, has durability, shows a low water absorption, causes no damage on the surface of a work, can selectively polish a portion which needs polishing and can be easily applied to various shapes.

What is claimed is:
1. A polishing pad for polishing a surface of a work, which comprises
   (A) said polishing pad being made of a resin formed of a ring-opened polymer from a cycloolefin by metathesis polymerization, and
   (B) said resin having a heat distortion temperature of 90 to 135° C., a compression modulus of 980 to 2,940 MPa and a water absorption of 0.01 to 0.25% by weight.
2. The polishing pad of claim 1, wherein said resin is a resin obtained by mixing a monomer solution (solution A)

containing a metathesis-polymerizable cycloolefin and containing a catalyst component for a metathesis polymerization catalyst system and a monomer solution (solution B) containing a metathesis-polymerizable cycloolefin and containing an activator component for the metathesis polymerization catalyst system, and casting a solution of the source mixture into a mold to carry out a polymerization and a crosslinking reaction in the mold.

3. The polishing pad of claim 1, wherein said resin is a ring-opened polymer from cycloolefins at least 70 mol % of which contains dicyclopentadiene.

4. The polishing pad of claim 1, wherein the resin has a heat distortion temperature of 100 to 125° C.

5. The polishing pad of claim 1, wherein the resin has a compression modulus of 1,274 to 2,450 MPa.

6. The polishing pad of claim 1, wherein the resin has a water absorption of 0.02 to 0.2% by weight.

7. The polishing pad of claim 1, wherein the resin contains 0.01 to 1% by weight of a surfactant.

8. The polishing pad of claim 7, wherein the surfactant is a fluorine-containing surfactant.

9. The polishing pad of claim 1, which has the form of a flat plate and has grooves in at least part of the surface thereof.

10. The polishing pad of claim 9, wherein the grooves have, a depth of 0.3 to 5 mm, a width of 0.3 to 4 mm and a pitch of 0.5 to 4 mm.

11. The polishing pad of claim 9, wherein the grooves have, a depth of 0.4 to 4 mm, a width of 0.4 to 3.5 mm and a pitch of 0.6 to 3.5 mm.

12. The polishing pad of claim 1, which is for polishing the surface of a sheet glass.

13. The polishing pad of claim 1, which is for polishing the surface of a sheet glass.

14. The polishing pad of claim 1, which is for polishing the surface of a silicon wafer.

15. The polishing pad of claim 1, which is for polishing the surface of an intermediary substrate in the course of Large Scale Integrated circuit (LSI) production.

16. A method for polishing the surface of a work, comprising the steps of:
    providing a polishing pad,
    applying an abrasive slurry containing fine particles to said surface of work, and
    polishing said surface of work with a polishing pad,
        said polishing pad being made of a resin formed of a ring-opened polymer from a cycloolefin by metathesis polymerization, and
        said resin having a heat distortion temperature of 90 to 135° C., a compression modulus of 980 to 2,940 MPa and a water absorption of 0.01 to 0.25% by weight.

17. The method of claim 16, wherein the work is a sheet glass.

18. The method of claim 16, wherein the abrasive slurry contains fine particles selected from the group consisting of silica particles, cerium oxide particles, alumina particles, zirconia particles, silicon carbide particles and manganese oxide particles.

19. A surface-smoothened sheet glass obtained by polishing according to the method recited in claim 16.

20. A surface-smoothened sheet glass for a liquid crystal display, obtained by polishing according to the method recited in claim 16.

21. The method of claim 16, wherein the work is a silicon wafer.

22. The method of claim 16, wherein the work is an intermediary substrate in the course of Large Scale Integrated circuit (LSI) production.

23. A surface-smoothened silicon wafer obtained by polishing according to the method recited in claim 16.

24. A surface-smoothened Large Scale Integrated circuit (LSI) obtained by polishing according to the method recited in claim 16.

* * * * *